July 9, 1946. D. H. SPANGLER 2,403,833
SUSPENSION AND LOAD EQUALIZING SYSTEM FOR VEHICLES
Filed Dec. 10, 1945 8 Sheets-Sheet 3

Inventor:
Daniel Herbert Spangler,
By Cushman, Darby & Cushman
Attorneys.

July 9, 1946.  D. H. SPANGLER  2,403,833
SUSPENSION AND LOAD EQUALIZING SYSTEM FOR VEHICLES
Filed Dec. 10, 1945  8 Sheets—Sheet 8

Inventor:
Daniel Herbert Spangler,
By Cushman, Darby & Cushman
Attorneys.

Patented July 9, 1946

2,403,833

UNITED STATES PATENT OFFICE 2,403,833

SUSPENSION AND LOAD EQUALIZING SYSTEM FOR VEHICLES

Daniel Herbert Spangler, Hamburg, Pa.

Application December 10, 1945, Serial No. 633,966

14 Claims. (Cl. 280—104.5)

1

The present invention relates to suspension and load equalizing systems for vehicles.

An important object of the invention is to provide suspension systems for vehicles which will resiliently support one or more axles to withstand the stresses resulting from road shock.

Another object of the invention is to provide suspension systems for use with dual axle assemblies which will permit the axles to move vertically with respect to each other and the vehicle frame, but which will withstand all torsional stresses.

Another object of the invention is to provide a suspension system whereby one or more axles will be permitted to move vertically with respect to the vehicle frame, but the axle or axles will be kept in properly tracking relation with regard to the vehicle.

A further object of the invention is to provide a resilient suspension element for vehicles and which is of such design that it will automatically adjust itself to accommodate varying loads and road shocks.

A still further object is to provide a suspension structure which will eliminate side sway of the vehicle.

In any vehicle using leaf spring suspension, all unevenness of the road sets up a twisting action. This twist is transmitted directly to the vehicle frame through the leaf spring pack since the very structure of a series of spring leaves does not allow for any torsional strain absorption.

With my coil spring suspension, the spring transmits only vertical motion and all torsional stress is dissipated through the various compensating joints and torque rods included in the structure.

Other objects and advantages of the invention will be apparent from the following description and drawings, wherein like numerals refer to similar parts throughout the several views.

2

Figure 1:
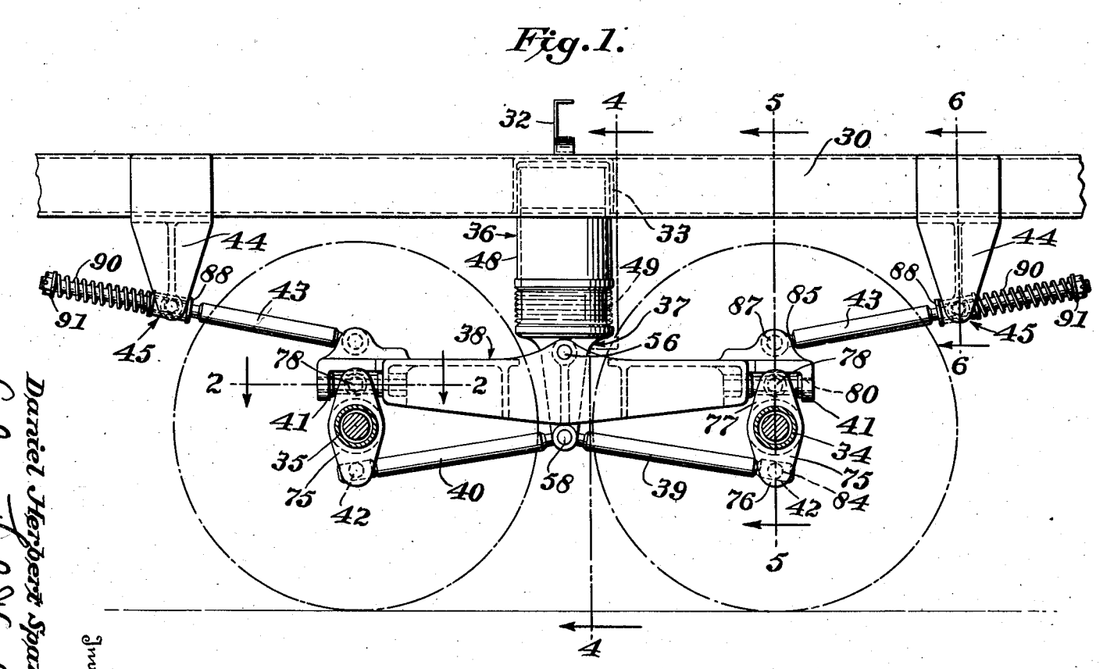
Figure 1 is a side elevation of a form of dual axle suspension included in the present invention, the view showing the axles and axle housings in vertical section and being taken on the line 1—1 of Figure 2.
Figure 2:
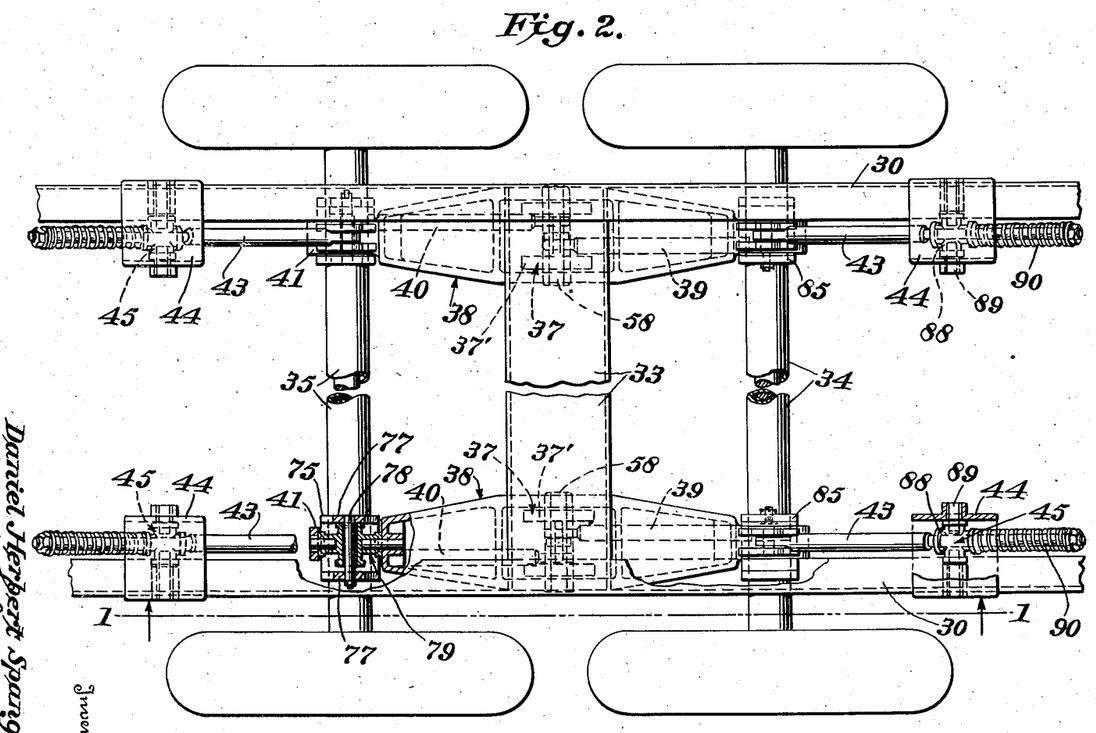
Figure 2 is a plan view of the Figure 1 structure, with portions of the vehicle frame broken away and a portion in horizontal section on the line 2—2 of Figure 1.
Figure 3:
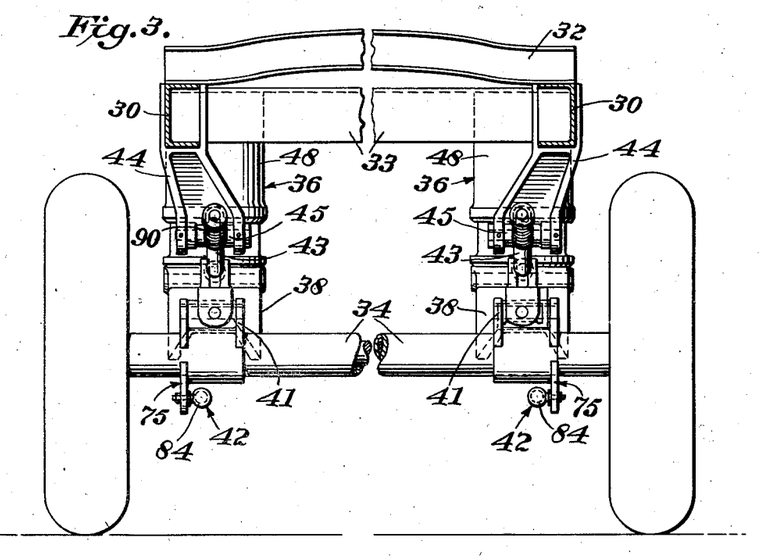
Figure 3 is an end view of the Figure 1 structure, the view looking from the right with respect to Figure 1.

Referring to Figures 1 to 14, inclusive, the principal elements illustrated in those figures are as follows: The numeral 30 designates each of the two side frames of a vehicle, for example, a motor truck or a trailer, and the numeral 32 designates a usual cross-brace for the vehicle. As best shown in Figures 2 and 3, an inverted U-beam 33 is secured to and extends between the two side frame members 30 at a point between the axle housings 34 and 35 of a dual or tandem axle assembly. A resilient or shock absorber element 36 comprising two vertically opposed cylinders is secured to each side frame 30 within cross-beam 33. The lower cylinder of each element 36 rigidly carries a bracket 37 on which a beam 38 is pivotally mounted for swinging movement about a horizontal axis. Below the pivot for beam 38, each bracket 37 also includes axially spaced pivots for a pair of torque rods 39 and 40 which, as best shown in Figure 1, extend in opposite directions longitudinally of the beam 38. The ends of the beam 38 are respectively connected by means of universal or gimbal connections 41 to flanged collars fixed to the axle housings 34 and 35, the connection 41 being positioned above the axle housings. The free ends of the torque rods 39 and 40 are connected to the flanged collars of the axle housings by a universal joint 42 such as a ball and socket connection, this connection being positioned below the axle housings. A radius rod 43 is pivotally connected to each end of each beam 38 so that the beam and radius rod may swing relative to each other about an axis extending transversely of the vehicle. Each radius rod 43 is connected to a bracket 44 which projects downwardly from the vehicle side frame at a point spaced from the axle housings and on the opposite side of the axle housings from the resilient element 36. Each radius rod 43 is connected to its corresponding bracket 44 by a connection generally designated 45 and which is of such design that the radius rod may swing with respect to its bracket 44 on an axis transverse of the vehicle and may also slide lengthwise of the vehicle frame and bracket 44.

Figure 12:
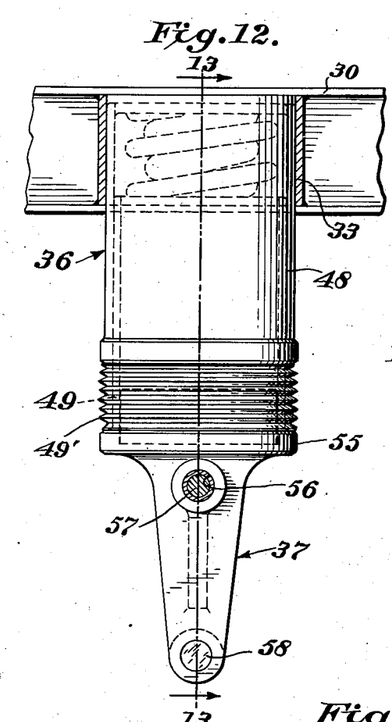
Figure 12 is a detail view showing the resilient mounting included in the present invention in side elevation.
Figure 13:
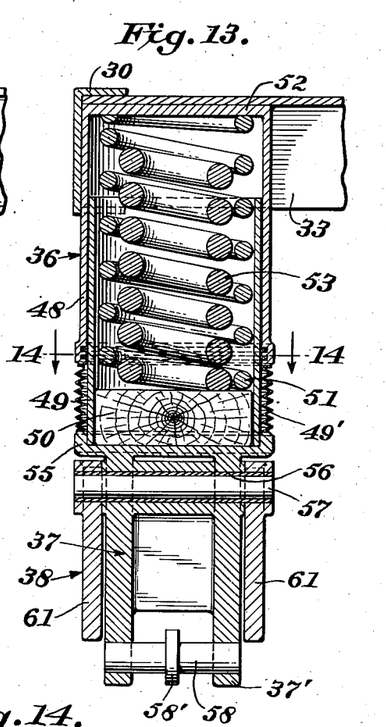
Figure 13 is a vertical section on the line 13—13 of Figure 12.
Figure 14:
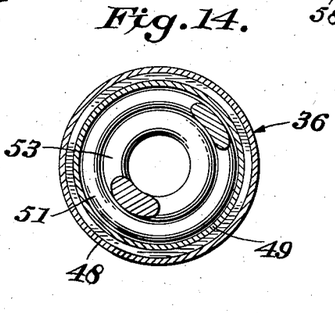
Figure 14 is a horizontal section on the line 14—14 of Figure 13.

The structure of Figures 1 to 14 may be described in more detail as follows: The resilient or shock absorber element 36 provided on each side frame 30 of the vehicle includes an outer and upper cylinder 48 closed at its upper end and this cylinder is welded or otherwise secured in the underside of the cross-beam 33 as best shown in Figures 12 and 13. As is indicated in the latter figure, each end of the cross-beam 33 extends into the adjacent side frame 30 and the side frame lower flange is recessed so that the cylinder 48 may extend downwardly in the frame. In this way, each cylinder 48 is firmly secured against sidewise movement in any direction. As best shown in Figures 1, 12 and 13, a lower and movable cylinder 49 is reciprocably mounted in each fixed cylinder 48, the lower end of each cylinder 49 being secured to the upper face of the bracket 37 so that the bracket closes the lower end of this cylinder. A block 50 of wood or the like may be mounted within cylinder 49 to rest on bracket 37. A helical spring 51 extends between the upper surface of the block 50 and the upper end wall 52 of fixed cylinder 48, spring 51 being of sufficient strength that, under normal load, it will hold the beam 38 spaced from the vehicle frame to an extent somewhat as shown in Figure 13. Within the spring 51, a second and heavier helical spring 53 is provided. However, as shown in Figure 13, spring 53 is of shorter length than the spring 51 and will not normally contact with the upper end wall 52 of the fixed cylinder 48. Under heavy load conditions, or under extreme road shock, the outer and lighter spring 51 will be compressed sufficiently to cause a part of the load to be absorbed by the inner and heavier spring 53. The provision of a lighter normal load carrying and shock absorbing spring to support weight and take up shock makes the present suspension more flexible under such conditions. Nevertheless, the provision of the inner and heavier spring enables the structure to properly absorb heavier road shocks. In order to exclude dust and dirt from the interior of the cylinder structure, suitable dust covers 49' may be provided, also packing rings may be installed to retain lubricating materials within the cylinder structure, all as illustrated in Figure 13.

It will be observed that the cylinders 48 and 49 fit closely, are of such large diameter and have sufficient overlapping length under all conditions that side sway of one with respect to the other will be prevented. Therefore, the body of the vehicle cannot have the objectionable side sway which occurs with leaf springs.

The construction of the bracket 37 is best illustrated in Figures 12 and 13. Referring to these figures, it will be observed that the upper portion 55 of the bracket has the form of an upwardly flanged circular disk, which, as stated above, forms the bottom of the lower and movable cylinder 49. An aperture 56 extends horizontally through the bracket 37 adjacent its upper portion 55 and a pin 57 extends through and is rotatable in this aperture to serve as a pivot for the beam 38 as hereinafter described. The extreme lower portion of bracket 37 is bifurcated and a pin 58 extends through and is fixed in apertures in this portion to serve as a connection for the torque rods 39 and 40 as hereinafter described.

Figure 7:
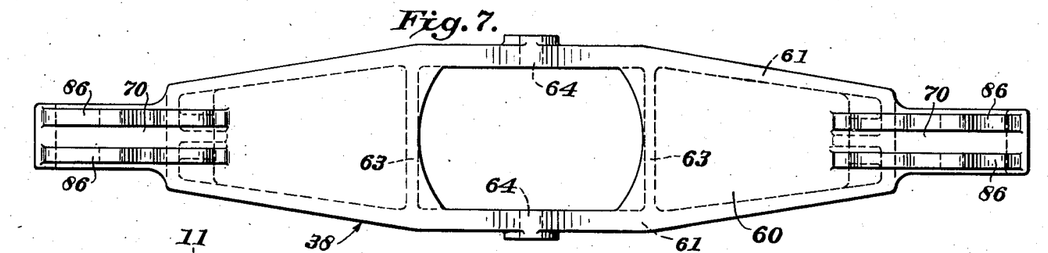
Figure 7 is a top plan view of the beam illustrated in Figure 1.
Figure 8:
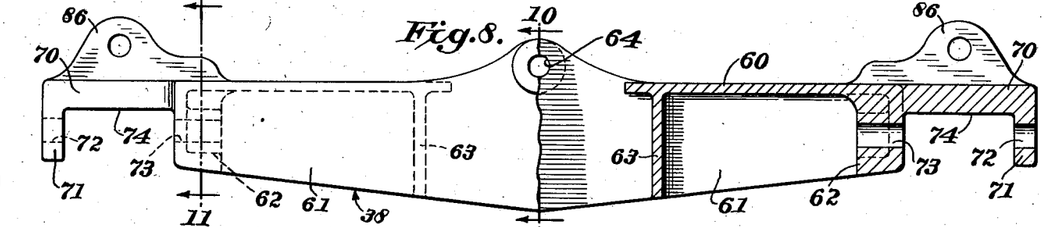
Figure 8 is a side view of the beam of Figure 7, with a portion in vertical longitudinal section.
Figure 9:
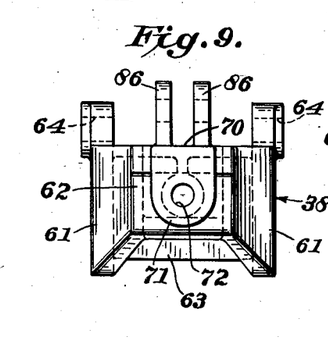
Figure 9 is an end view of the beam of Figure 7.
Figure 10:
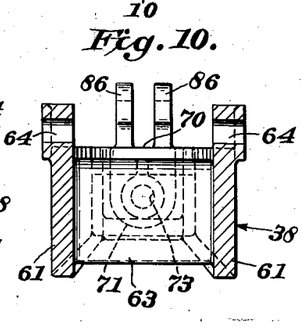
Figure 10 is a vertical transverse section on the line 10—10 of Figure 8.
Figure 11:
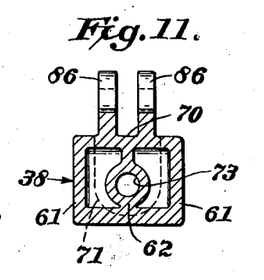
Figure 11 is a vertical transverse section on the line 11—11 of Figure 8.

The beams 38 provided adjacent each side frame 30 of the vehicle are pivoted to the respective brackets 37 as best illustrated in Figure 1. The detailed structure of each beam 38 is shown in Figures 7 and 8. It will be observed from these views that each beam is of generally U-shaped form in transverse section to include a top wall 60 and side walls 61, with transverse webs 62 adjacent its ends, additional webs 63 being provided adjacent the median portion of the beam. At the central portion of the beam the top wall 60 is cut away so that the beam may laterally enclose the bracket 37 as illustrated in Figure 13. At its upper and central portion, each side wall 61 of the beam is provided with an aperture 64 in which the ends of the pin 56 of bracket 37 will be fixed. It will be observed from Figure 1 that each beam 38 may swing with respect to its bracket 37 about an axis extending transversely of the vehicle, each beam also having a vertical movement with its bracket 37 and the lower cylinder 49 of the corresponding resilient supporting element 36.

Figure 4:
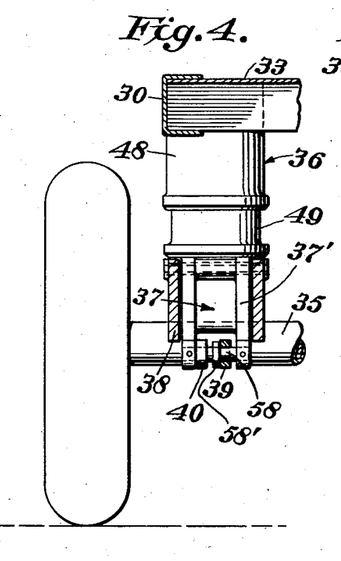
Figure 4 is a transverse vertical section on the line 4—4 of Figure 1.

The torque rods 39 and 40 are of solid construction and, as best illustrated by the dotted line showing of those rods in Figure 2, and the sectional showing thereof in Figure 4, each rod is flattened along vertical lines at its inner end and the flattened portion includes an aperture which surrounds the pin 58 carried in the lower end of each bracket 37. As shown in Figures 4 and 13, the pins 58 may be flanged intermediate their length to space the torque rods from each other. By this arrangement, the torque rods may swing in vertical planes with respect to the brackets 37 and the torque rods will also move vertically with the bracket. It will be observed that on the bracket 37 the points of pivotal connection of the torque rods and beam 38 are fixed with respect to each other and are vertically spaced along the median lines of the brackets.

Figures 5, 6:
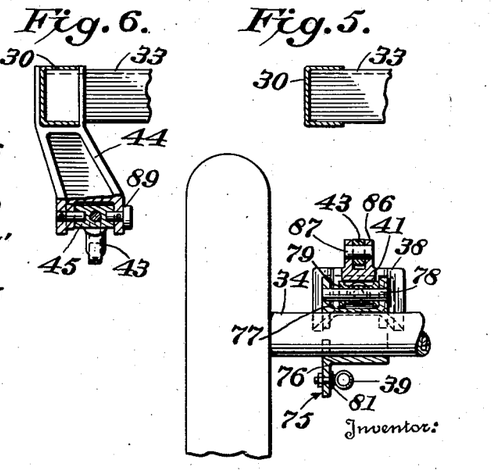
Figure 5 is a vertical transverse section on the line 5—5 of Figure 1.
Figure 6 is a vertical transverse section on the line 6—6 of Figure 1.

The structure whereby the opposite ends of each beam 38 are connected to an axle housing is as follows: As is illustrated in Figures 7 to 11, an extension 70 projects beyond the web 62 of each end portion of a beam, the extension 70 including a downwardly extending shoulder 71 at its outer end. Aligned apertures 72 and 73 are provided in each shoulder 71 and web 62, respectively. By this construction, a downwardly facing recess 74 is provided at each end of each beam 38. As is best shown in Figures 3 and 5, a collar or sleeve 75 is fixed to each end of each axle housing at a point inwardly of the adjacent wheel and beneath the end of the corresponding beam 38. A sleeve 75 appears in side elevation in Figure 1 and it will be observed from that figure and Figure 5 that each sleeve includes a central portion 76 which embraces the axle housing, a downwardly projecting tongue 76 at its outer edge and two upwardly projecting tongues 77, the tongues 77 being spaced the length of the collar 75. A pin 78 is fixed in apertures in the upwardly extending tongues 77 and this pin carries a cruciform element 79 shown in the broken away portion at the lower left hand portion of Figure 2. The cruciform element 79 is rotatable about the fixed pin 78 on an axis transversely of the vehicle. Pins 80 are fixed in cruciform element 79 to project at right angles to pin 78, the axes of all of these pins lying in the same plane. The pins 80 are rotatable on an axis lengthwise of the vehicle in the apertures 72 and 73, respectively, of the end recess 74 of beam 38. Therefore, cruciform element 79 is rotatable on an axis extending lengthwise of the vehicle.

It will be observed that the pivot points 41 and 42 lie in the same vertical plane as the axis of the corresponding axle housing and axle.

By this construction, the beam 38 and an axle housing may swing with respect to each other on an axis extending transversely of the vehicle and, in addition, have relative movement on an axis extending longitudinally of the vehicle. Therefore, an axle housing may either move upwardly or downwardly without endwise tilting, or may tilt from end to end, because of the universal joints 41 thus provided between each end of each axle housing and the corresponding ends of the beams 38.

As indicated in Figures 1 and 5, the outer end of each torque rod 39 and 40 is connected to the lower tongue 76 of axle housing collar 75 by a ball and socket joint, the tongue 76 carrying a stud 81 including a ball-shaped portion to fit a socket in the free end of the corresponding torque rod. This universal connection, generally designated by the numeral 42, will further enable the axle housing to tilt lengthwise or move vertically and translationally as described in the preceding paragraph.

It will be perceived that the provision of the beam 38 and the torque rods 39 and 40, at each wheel end of the tandem axle assembly, with the beam and torque rods pivoted to a bracket between the two axle housings, provides a parallelogram connection between both ends of the axles. More particularly, neither axle housing can rotate on its own axis and with respect to the other axle housing, regardless of whether it moves up and down by endwise tilting or translationally, because the pivot points 41 and 42 are the corners of one end of a parallelogram which has its opposite end corners positioned at the pivot points 41 and 42 at the same end of the other axle. In short, though an axle housing may move upwardly or downwardly with respect to its opposite end, as well as with respect to the other axle housing, a pivot point 41 will always be directly above a pivot point 42 and the axle housings cannot turn with respect to each other.

Each radius rod 43 is provided with an aperture 85 in its inner end as best shown in Figures 1 and 5 and this end is secured between upwardly projecting ears 86 (Figures 7 and 8) by a pin 87 fixed to and extending between the ears and through aperture 85. A radius rod is provided at each end of each beam. As best shown in the lower right hand portion of Figure 2, the outer portion of each radius rod 43 is slidable in and extends through a cruciform element 88. Each element 88 includes pins 89 fixed thereto (Figure 6) and rotatable in apertures in the lower ends of the bracket 44. In this way, the radius rod can swing both with respect to beam 38 and bracket 44 on axes extending transversely of the vehicle. A spring 90 encircles each radius rod 43 beyond the cruciform fitting 88, the inner end of the spring bearing on fitting 88 and the outer end of the spring bearing against a washer and nut assembly 91 positioned at the outer end of the radius rod. While each radius rod may slide through its fitting 88 and thereby generally lengthwise of the vehicle, the spring 90 exerts an outward pull on the rod.

The radius rods 43 assist in preventing the dual axle assembly from rotating about a vertical axis midway between the spring mounts 36, through the fact that a shock absorber element 36a is positioned at each end of the dual axle assembly primarily prevents such rotation and thereby assures proper tracking. The radius rods 43 and their associated springs 90 have the further function of urging the axles to return smoothly to a normal position from any upward or downward movement with respect to the vertical frame. That is, the fact that the radius rods are provided at both ends of each side of the assembly holds the assembly under tension and prevents undue horizontal and vertical swing of the beams 38 relative to the brackets 37. Also, the spring-loaded radius rods act as dampeners or shock absorbers with regard to vertical movement of the springs 51 and 53.

It will be observed from the lower left hand portion of Figure 2, and also from Figure 5, that the cruciform elements 79 have a width less than the space between the tongues 77 on the corresponding collars 75. As is also indicated in these figures, when the dual axles are horizontal, each cruciform element 79 will be so positioned on its cross-pin 78 that a space will exist being the outer tongue 77 and the adjacent end of the element 79. Also, as shown in Figure 4, and in dotted lines in Figure 2, the inner ends of the torque rods 39 and 40 are normally spaced from the pin flange 58' and the inner arm 37' of the brackets 37. By this arrangement, when an axle tilts, the corresponding cruciform element may slide on its pin 78, and the corresponding torque rods may slide on pin 58. This will maintain the beam 38 and radius rod in their common and normal vertical plane. Because of the fact that the surfaces of the elements 79 nearest the longitudinal center-line of the vehicle are normally in contact with the adjacent tongues 77, the axles 34 and 35 cannot move along their axes.

It will be noted from the above that the structure described in Figures 1 to 14 will hold the axles of the dual axle assembly against rotation with respect to each other, but without preventing either end of either axle from moving vertically in accordance with the road surface. Moreover, the resilient mounting 36 for each beam 38, taken with the springs 90 of the radius rods, will insure that all road shocks will be smoothly absorbed.

It will be understood that the structure described in Figures 1 to 14 may be used in an assembly where both axles are either dead or driven, or one axle is dead and the other driven.

Referring to Figures 15 to 20, which illustrate a modified form of dual axle assembly, this form differs from that of Figures 1 to 14 primarily in that the torque rods used therein are positioned above the beams and radius rods are connected directly to the axle housings, instead of to the beams.

In more detail, in Figures 15 to 20, the numeral 100 designates the side frame elements of the vehicle, these elements being rigidly cross-connected by a transverse beam 101. A resilient supporting element or shock absorber 36a is positioned at the intersection of each side frame 100 and cross-member 101 just as has been described above in connection with the structure of Figures 1 to 14. The element 36a has a construction identical with that described with regard to the preceding figures.

Figure 15:
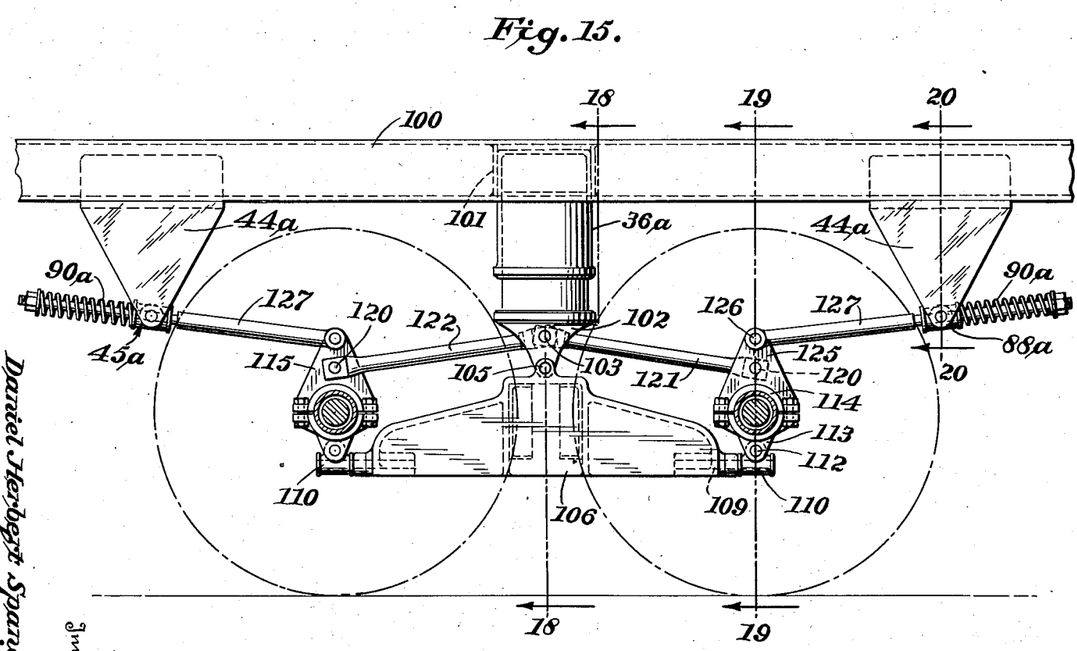
Figure 15 is a side elevation of a modified form of suspension for dual axle assemblies, the view showing the axles and axle housings in vertical section and being taken on the line 15—15 of Figure 16.
Figures 18, 19, 20:
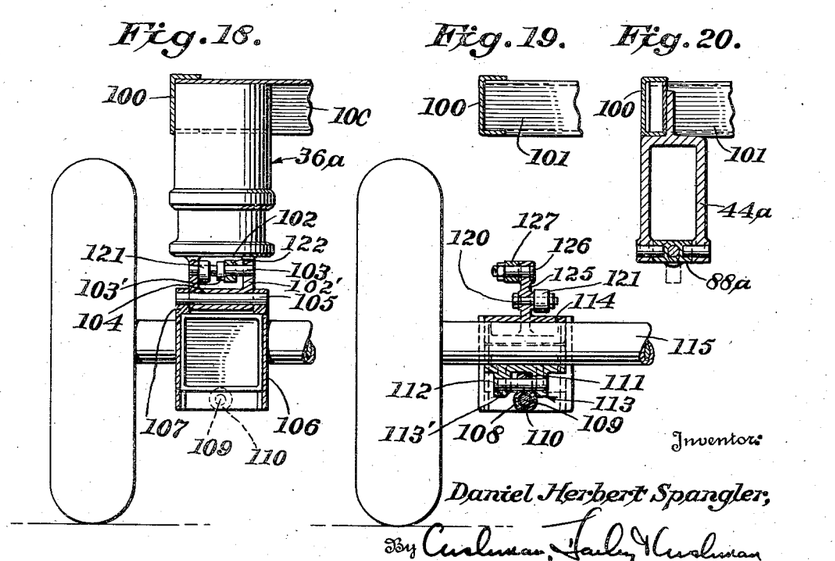
Figure 18 is a transverse vertical section on the line 18—18 of Figure 15.
Figure 19 is a transverse vertical section on the line 19—19 of Figure 15.
Figure 20 is a transverse section on the line 20—20 of Figure 15.

As is best shown in Figure 18, a bracket 102 provided at the lower end of the movable cylinder of each shock absorber 36a has a cross-pin 103 fixed therein and provided with a central flange 103'. In addition, the extreme lower portion of each bracket 102 is provided with a horizontally and transversely extending bore 104 which carries a cross-pin 105. A beam 106 is pivoted to the lower end of each bracket 102 by means of upwardly extending ears 107, the ears being apertured to engage the ends of the pin 105 and the pin being secured to the ears. Each end of each beam 106 has a pin 109 fixed therein and extending longitudinally from the beam as illustrated in Figure 15. Beyond the beam, each pin 109 has a sleeve 110 rotatable thereon, the sleeve 110 including an upwardly extending and transversely apertured lug 111 through which a pin 112 extends. The pin 112 is fixed in spaced ears 113 which project downwardly from a fitting 114 secured near the wheel end of the adjacent axle housing 115 and sleeve 110 is rotatable about pin 112. In this way, each beam 106 and the axle housings at the ends thereof may move with respect to each other about the axes of the pins 109 extending longitudinally of the beams and vehicle. In addition, the axle housings may swing with respect to beams on the axes of the pins 112 extending transversely of the beams. In short, universal joints are thereby provided between the beams and axle housings.

Each axle housing fitting 114 includes an integral and upwardly extending plate 125 and a fixed pin 120 projects laterally from each plate as shown in Figure 15. The outer end of the corresponding torque rod is pivoted on the pin 120, the two torque rods on each side of the assembly being respectively designated by the numerals 121 and 122. As has been indicated above, a torque rod 121 and a torque rod 122 are associated with each beam 106, the inner end of each torque rod being pivoted on the pin 103.

By the above-described pivotal connections, the axle housings can tilt with respect to the beams 106 or rotate on their axes with respect to the beam, but the two axle housings cannot turn with respect to each other because of the parallelogram relationship afforded by the beam 106 and the torque rods and the manner in which the various pivots are arranged with respect to each other.

As shown in Figure 19, the upwardly extending plate 125 of each axle housing fitting 114 also has a pin 126 fixed therein to extend laterally. The inner end of a radius rod 127 is pivoted on the corresponding pin 126, each radius rod extending outwardly to a bracket 44a secured to the vehicle frame at a point spaced from its axle housing and on the opposite side of the latter from the shock absorber 36a. Each radius rod 127 is slidable through a cruciform fitting 88a which is rotatable in the bracket 44a on an axis extending transversely of the vehicle, the cruciform fitting 88a being identical with the fitting 88 of Figures 1 to 14. A spring 90a is mounted about the outer portion of each rod 127 to function in the same manner as the spring 90 of the structure of Figures 1 to 14.

Figure 16:
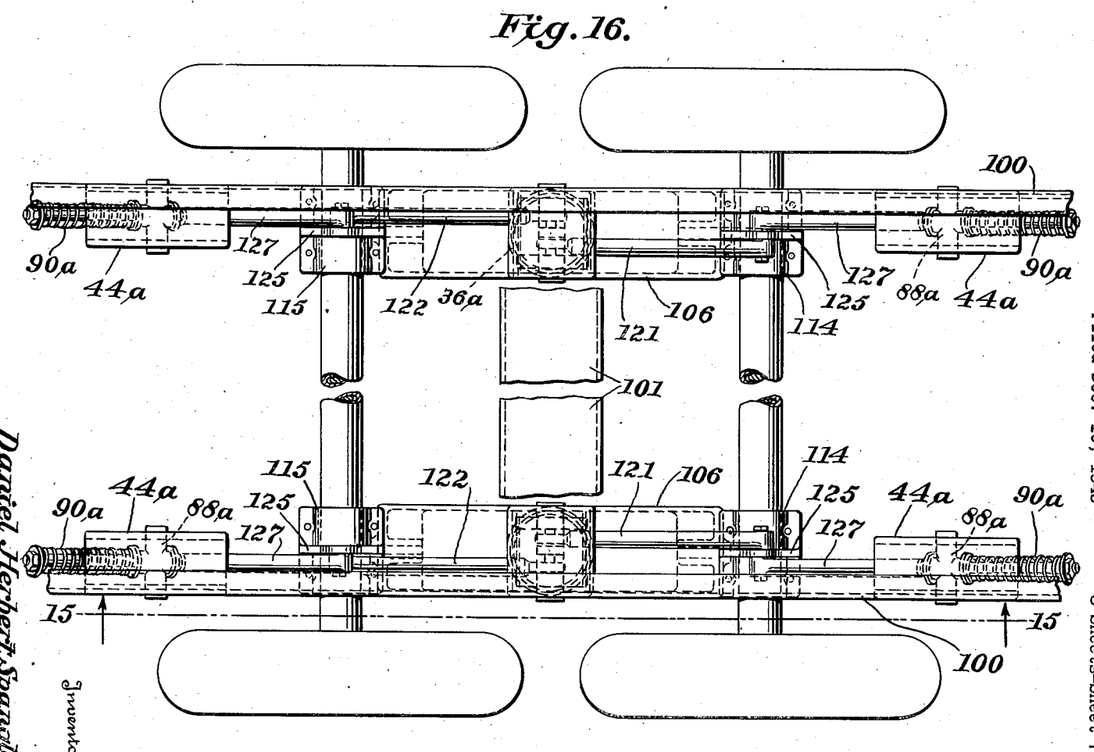
Figure 16 is a plan view of the Figure 15 structure.
Figure 17:
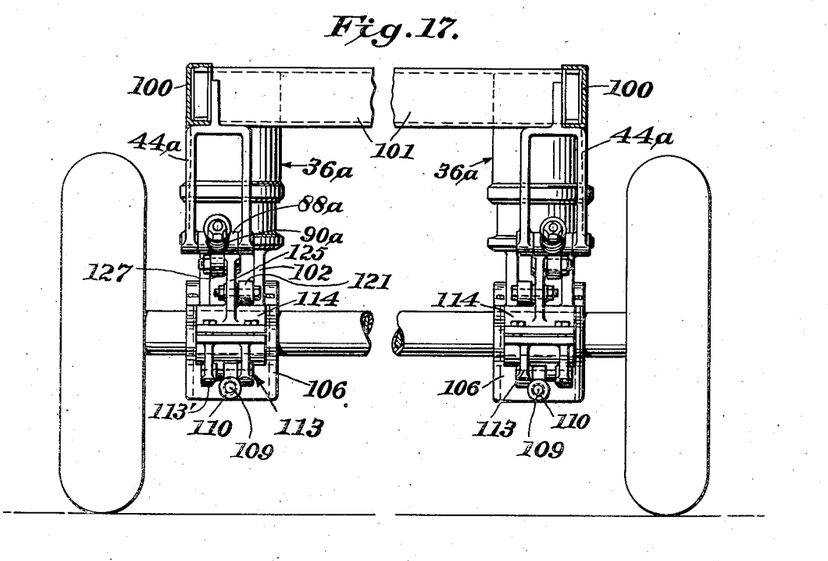
Figure 17 is an end view of the Figure 15 structure.

As is shown in Figure 18, and in dotted lines in Figure 16, the inner ends of the torque rods 121 and 122 are normally spaced from the pin flange 103' and the inner leg 102' of bracket 102. As shown in Figure 19, the lug 111 carried by pin 109 is normally spaced from the outer ear 113' of the pair of ears 113. Because of this arrangement, when an axle tilts, the beam 106 and radius rods 127 will remain in their normal vertical planes.

The operation of the structure of Figures 15 to 20 is identical with that disclosed in Figures 1 to 14, the primary difference between the two structures being that the torque rods 121 and 122 of Figures 15 to 20 are positioned above the beam 106 instead of below the beams as in the structure of Figures 1 to 14. As in the previous structure, that just described can be used with either two driven or dead axles, or one of each.

The terminology used in the specification is for the purpose of description and not of limitation, the scope of the invention being defined in the claims.

I claim:

1. In a suspension and load equalizing system for vehicles, vehicle side frame members, a tandem axle unit including axle housings, a pair of brackets, means to resiliently secure said brackets for vertical movement with relation to the respective side frame members at points between the axle housings, upper and lower elements pivoted to each of said brackets at vertically spaced points and pivotally connected to said axle housings adjacent the ends of the latter to maintain the latter against rotation with respect to each other and about their axes, and means carried by the side frames to exert tension on said axle housings longitudinally of the vehicle.

2. In a suspension and load equalizing system for vehicles, vehicle side frame members, a tandem axle unit including axle housings, a pair of brackets, means to resiliently secure said brackets for vertical movement with relation to the respective side frame members at points between the axle housings, upper and lower elements pivoted to each of said brackets at vertically spaced points and pivotally connected to said axle housings adjacent the ends of the latter to maintain the latter against rotation with respect to each other and about their axes, one of said elements being pivoted intermediate its length to said bracket and the other element comprising two rods extending in opposite directions from said bracket and longitudinally with respect to the vehicle, and means carried by the side frames to exert tension on said axle housings longitudinally of the vehicle.

3. In a suspension and load equalizing system for vehicles, vehicle side frame members, a tandem axle unit including axle housings, a pair of brackets, means to resiliently secure said brackets for vertical movement with relation to the respective side frame members at points between the axle housings, upper and lower elements pivoted to each of said brackets at vertically spaced points and pivotally connected to said axle housings adjacent the ends of the latter to maintain the latter against rotation with respect to each other and about their axes, said lower element comprising a beam pivoted intermediate its length to said bracket and said upper element comprising two rods each pivoted to said bracket and extending in opposite directions therefrom and longitudinally of the vehicle, and means carried by the side frames to exert tension on said axle housings longitudinally of the vehicle.

4. In a suspension and load equalizing system for vehicles, vehicle side frame members, a tandem axle unit including axle housings, a pair of brackets, means to resiliently secure said brackets for vertical movement with relation to the respective side frame members at points between the axle housings, upper and lower elements pivoted to each of said brackets at vertically spaced points and pivotally connected to said axle housings adjacent the ends of the latter to maintain the latter against rotation with respect to each other and about their axes, said upper element comprising a beam pivoted intermediate its length to said bracket and said lower element comprising two rods each pivoted to said bracket and extending in opposite directions therefrom and longitudinally of the vehicle, and means carried by the side frames to exert tension on said axle housings longitudinally of the vehicle.

5. In a suspension and load equalizing system for vehicles, a tandem axle unit including axle housings, a pair of brackets, means to resiliently secure said brackets below and for vertical movement with relation to the respective side frames of the vehicle at a point between the axle housings, a pair of beams, one pivoted intermediate its ends on the respective brackets and for vertical swinging movement with relation to said bracket, a pair of torque rods pivoted to each of said brackets at a point vertically spaced with respect to the corresponding beam pivot point, said torque rods being pivoted for movement in a substantially vertical plane, said beam and the free ends of said torque rods being pivoted to the respective axle housings at points on said housings vertically opposite each other, said last-named pivot connections being universal joints, and means to resiliently connect corners of said beam, torque rod and axle housing assembly to respective points on the side frames of the vehicle which are spaced lengthwise of the vehicle from said assembly.

6. A suspension and load equalizing system of the character described in claim 5 wherein the beams are pivoted to the brackets and axle housings above the corresponding pivot points for the torque rods.

7. A suspension and load equalizing system of the character described in claim 5 wherein the beams are pivoted to the brackets and axle housings below the corresponding pivot points for the torque rods.

8. In a suspension and load equalizing system for vehicles, a pair of body frame side members, a tandem axle unit including axle housings, a pair of brackets, means to resiliently secure said brackets below and for vertical movement with relation to the respective side frame members, a pair of beams, each pivoted intermediate its ends to one of said brackets and adapted to extend longitudinally of the vehicle frame, a pair of torque rods pivoted to each of said brackets at a point vertically spaced with regard to the pivot of the corresponding beam, the respective rods of each pair projecting in opposite directions and longitudinally of said beams, the ends of said beams being pivotally connected to the ends of the respective axle housings, and the free ends of said rods being pivotally connected to the respective axle housings at a point on the latter opposite the beam pivot, all of said points of pivotal connection being so related that the pivot points on the corresponding ends of the axle housings define the corners of a parallelogram.

9. In a suspension and load equalizing system for vehicles, a pair of body frame side members, a tandem axle unit, including axle housings, a pair of brackets, means to resiliently secure said brackets below and for vertical movement with relation to the respective side frame members, a pair of beams, each pivoted intermediate its ends to one of said brackets and adapted to extend longitudinally of the vehicle frame, a pair of torque rods pivoted to each of said brackets below said beams, the respective rods of each pair projecting in opposite directions and longitudinally of said beams, the ends of said beams being pivotally connected to the upper portions of the ends of the respective axle housing and the free ends of said rods being pivotally connected to the lower portions of the ends of the respective axle housings, all of said points of pivotal connection being so related that the pivot points on the corresponding ends of the axle housings define the corners of a parallelogram.

10. In a suspension and load equalizing system for vehicles, a pair of body frame side members, a tandem axle unit including axle housings, a pair of brackets, means to resiliently secure said brackets below and for vertical movement with relation to the respective side frame members, a pair of beams, each pivoted intermediate its ends to one of said brackets and adapted to extend longitudinally of the vehicle frame, a pair of torque rods pivoted to each of said brackets above said beams, the respective rods of each pair projecting in opposite directions and longitudinally of said beams, the ends of said beams being pivotally connected to the lower portions of the ends of the respective axle housings and the free ends of said rods being pivotally connected to the upper portions of the ends of the respective axle housings, all of said points of pivotal connection being so related that the pivot points on the corresponding ends of the axle housings define the corners of a parallelogram.

11. In a suspension and load equalizing system for vehicles, a pair of body frame side members, a tandem axle unit including axle housings, a pair of brackets, means to resiliently secure said brackets below and for vertical movement with relation to the respective side frame members, a pair of beams, each pivoted intermediate its ends to one of said brackets and adapted to extend longitudinally of the vehicle frame, a pair of torque rods pivoted to each of said brackets at a point vertically spaced with regard to the pivot of the corresponding beam, the respective rods of each pair projecting in opposite directions and longitudinally of said beams, the ends of said beams being pivotally connected to the ends of the respective axle housings, the free ends of said rods being pivotally connected to the respective axle housings at a point on the latter vertically opposite the beam pivot, all of said points of pivotal connection being so related that the pivot points on the corresponding ends of the axle housings define the corners of a parallelogram, radius rods, one pivoted to and extending longitudinally from each corner of the axle housing and beam structure, brackets adapted to receive the free ends of the respective radius rods and secured to the corresponding vehicle side frame at a point on the opposite side of the adjacent axle housing from said first-named bracket, each of said radius rods being longitudinally slidable and vertically tiltable with respect to its vehicle frame bracket.

12. In a suspension and load equalizing system for vehicles, a pair of body frame side members, a tandem axle unit including axle housings, a pair of brackets, means to resiliently secure said brackets below and for vertical movement with relation to the respective side frame members, a pair of beams, each pivoted intermediate its ends to one of said brackets and adapted to extend longitudinally of the vehicle frame, a pair of torque rods pivoted to each of said brackets below said beams, the respective rods of each pair projecting in opposite directions and longitudinally of said beams, the ends of said beams being pivotally connected to the upper portions of the ends of the respective axle housings and the free ends of said rods being pivotally connected to the lower portions of the ends of the respective axle housings, all of said points of pivotal connection being so related that the pivot points on the corresponding ends of the axle housings define the corners of a parallelogram, radius rods, one pivoted to and extending longitudinally from each corner of the respective beams, brackets adapted to receive the free ends of the respective radius rods and secured to the corresponding vehicle side frame at a point on the opposite side of the adjacent axle housing from said first-named bracket, each of said radius rods being longitudinally slidable and vertically tiltable with respect to its vehicle frame bracket.

13. In a suspension and load equalizing system for vehicles, a pair of body frame side members, a tandem axle unit including axle housings, a pair of brackets, means to resiliently secure said brackets below and for vertical movement with relation to the respective side frame members, a pair of beams, each pivoted intermediate its ends to one of said brackets and adapted to extend longitudinally of the vehicle frame, a pair of torque rods pivoted to each of said brackets above said beams, the respective rods of each pair projecting in opposite directions and longitudinally of said beams, the ends of said beams being pivotally connected to the lower portions of the ends of the respective axle housings and the free ends of said rods being pivotally connected to the upper portions of the ends of the respective axle housings, all of said points of pivotal connection being so related that the pivot points on the corresponding ends of the axle housings define the corners of a parallelogram, radius rods, one pivoted to and extending longitudinally from each end of each axle housing, brackets adapted to receive the free ends of the respective rods and secured to the corresponding vehicle side frame at a point on the opposite side of the adjacent axle housing from said first-named bracket, each of said radius rods being longitudinally slidable and vertically tiltable with respect to its vehicle frame bracket.

14. A suspension and load equalizing system of the character described in claim 1 wherein the connection between one of said elements and the axle housings comprises a universal joint including a cruciform member.

DANIEL HERBERT SPANGLER.